9049X
J. Putnam,
Brick Mold,
Patented Aug. 20, 1835.
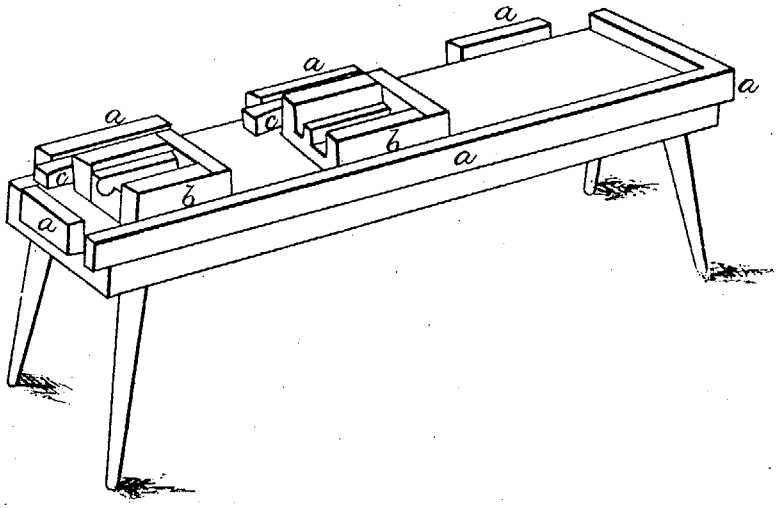
AM. PHOTO-LITHO. CO. N.Y. (OSBORNE'S PROCESS)

Joseph Putnam of Salem Massachusetts
Letters Patent

The Schedule referred to in these Letters Patent and making part of the same containing a description in the words of the said Joseph Putnam himself of his improvement in the method of making from Clay or other Compositions of matter Slabs for fire Backs, Stove linings circular Bricks with tongue and groove to match so as to form a cylinder for lining Stoves making drains &c.

To all persons to whom these Presents shall come Joseph Putnam of Salem in the County of Essex and State of Massachusetts sends Greeting. Be it known that I the said Joseph Putnam have invented constructed made and applied to use, a new and usefull improvement in the method of making from Clay or other compositions of matter, Slabs for Fire Backs, Stove linings, circular Bricks with tongue and groove to match so as to form a cylinder for lining Stoves or for making large or small drains or water conductors together with various other articles of any shape or form required, by the use of moulds constructed and used in the manner following Viz 1st A Platform made of Plank of suitable dimensions to contain the moulds to be used. one side and one end of the plank to have a cleat nailed strong against the plank rising two or three inches above the surface, the opposite side and end of the plank to have cleats nailed down strong and at a sufficient distance from the first named cleats, to admit the moulds with block between the mould and the last mentioned cleats so that when the mould is placed on the Platform against the first mentioned cleats, the parts of the mould may be wedged between the cleats and held firm. 2d. The bottom part of the mould to be in the form of the article required to be made with bevels, notches grooves, sunken or in relief 3d if the pieces or blocks that form the grooves or notches are large they should not be confined to the bottom but should be removed from the article when discharged from the mould. 4th the sides of the mould to Drawing Also

9049 X be in seperate pieces and ^made^ to bear against the sides of the bottom piece
rising high enough above the bottom to make the whole the thick
ness required. 5th If the sides of the article is required to be
bevelled or in any other shape the side pieces of the mould should
be made so as to give the article the form required. 6th the
bottom part of the mould to be covered with cloth and the side
pieces sanded to prevent the mortar from adhering. 7th the
mortar to be in as hard a consistancy as will admit of the parts being
well united. 8th The mould to be partly filled and pounded down
with a mallet or pounder so as to fill the corners at the bottom
then the mould to be filled up by slapping mortar on with the
hand so as to make the parts unite. the surplus mortar to be cut
of and the article smoothed. 9th When the articles is formed
the wedges and blocks to be removed, the sides of the mould
taken off the article to be carried on the bottom piece of the mould
and turned up on the edge, the bottom removed and left to dry.

In testimony that the above is a true specification of my said
improvement as above described. I have hereto set my hand the
second day of June A.D. 1835

Exd. Witnesses
[illegible] Benj Merrill
Edward Symonds

Joseph Putnam (663 words)

(Patented 21st August 1835.)